United States Patent [19]

Abe et al.

[11] 4,136,336
[45] Jan. 23, 1979

[54] KEYBOARD APPARATUS

[75] Inventors: Kiyomi Abe; Hidetoshi Kameda, both of Soka, Japan

[73] Assignee: Pentel Kabushiki Kaisha, Japan

[21] Appl. No.: 777,826

[22] Filed: Mar. 15, 1977

[30] Foreign Application Priority Data

Mar. 19, 1976 [JP] Japan .................................. 51-29348
May 14, 1976 [JP] Japan .................................. 51-55162

[51] Int. Cl.² .......................... G08C 1/00; G06F 3/02
[52] U.S. Cl. ............................. 340/365 S; 340/365 R;
178/17 C; 340/146.3 SY
[58] Field of Search .......... 340/365 R, 365 C, 365 L,
340/365 S, 365 P, 146.3 AQ, 146.3 SY; 178/18,
19, 17 A, 17 C; 197/98, 100; 179/90 K; 200/5
A; 400/472, 473, 486, 475, 477

[56] References Cited

U.S. PATENT DOCUMENTS

| | | | |
|---|---|---|---|
| 3,158,317 | 11/1964 | Alexander | 340/365 R |
| 3,187,321 | 6/1965 | Kameny | 340/365 R |
| 3,560,964 | 2/1971 | Bedell et al. | 340/365 R |
| 3,956,745 | 5/1976 | Ellis | 340/365 R |

*Primary Examiner*—John W. Caldwell, Sr.
*Assistant Examiner*—Donnie L. Crosland
*Attorney, Agent, or Firm*—Robert E. Burns; Emmanuel J. Lobato; Bruce L. Adams

[57] ABSTRACT

A keyboard apparatus includes a pair of juxtaposed tablets against which a single probe or signal pen may be applied through an overlay or overlays. Each tablet has a multiplicity of key segments defined on its surface at specified coordinates. Each segment is operable as a key as the probe is applied against a particular overlay which assumes an open position over a selected one of the tablets. A plurality of overlays are bound in a binder or fastener in the form of a book so that any overlay can assume an open position on either tablet. Each overlay has indicium segments on its surface which correspond to the key segments and on which indicia such as letters or characters designating the key segments may be entered. When a particular overlay assumes an open position on one of the tablets, a probe may be applied against a desired indicium segment thereof, whereupon the probe senses a signal from the corresponding key segment. Means is provided for sensing which one of the overlays assumes an open position on the associated tablet and for producing a detection signal. A sensed key signal and the detection signal are combined to provide a digital signal which identifies the desired indicium segment on the particular overlay.

11 Claims, 5 Drawing Figures

FIG. 3
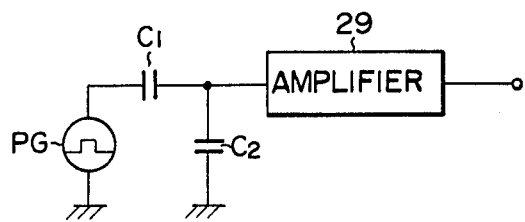
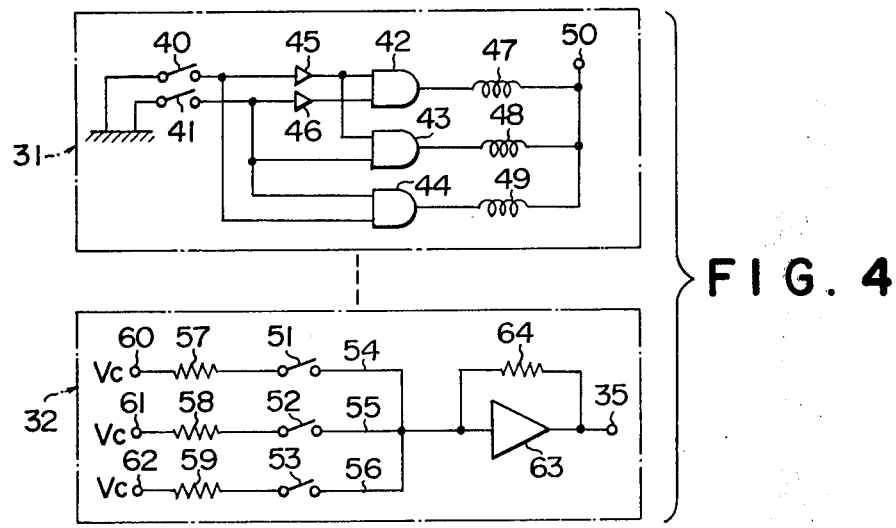
FIG. 4
FIG. 5
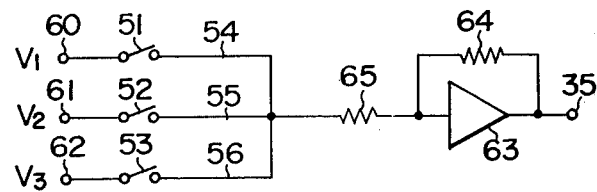

KEYBOARD APPARATUS

BACKGROUND OF THE INVENTION

The invention relates to a keyboard apparatus, and more particularly, to a keyboard apparatus which incorporates a plurality of overlays bound in the form of a book.

In applications such as inventory, input operation of Chinese characters or ticket reservation where a quantity of information must be processed, it is necessary for a keyboard apparatus used to input thousands or tens of thousands of information items. A typical apparatus includes a pair of keyboards juxtaposed to each other and between which a binder is fixedly mounted, with a plurality of overlays being coupled with the binder so as to permit any page to be opened over the respective keyboards. Each overlay is provided with a number of indicia such as the name of goods, flight numbers or the like at positions thereon which corresponds to individual key switches on each board. When an overlay of a given page assumes an open position over the keyboard, the indicia on that overlay provide a visual definition of corresponding key switches of the keyboard. A selection switch is provided to permit a distinction between the overlays so that when a particular overlay assumes an open position over the keyboard, a signal obtained from a particular key can be distinguished from a corresponding signal from the same key when another overlay is in its open position. Theoretically, this should enable an inputting operation of a quantity of information which corresponds to the product of the number of key switches actually provided, multiplied by the number of overlays.

The keyboard apparatus of this kind is disclosed, for example, in Japanese Patent Publication No. 24,306/1967 and U.S. Pat. No. 3,560,964 where the keyboard includes key jacks or key buttons. It will be seen that the number of keys which can be disposed on the keyboard is limited in view of practical manoeuvrability, and if it is desired to increase the number of information items which can be inputted, the number of overlays must be increased, with consequence that an extra time is needed to index a desired overlay. The number of keys which can be provided is also limited for the reason that each overlay is formed with apertures aligned with the individual key jacks or key buttons, so that there must be left a space between adjacent apertures to accommodate the indicia. The overlays used must be of a predetermined configuration or format, which causes inconvenience. The provision of a multiplicty of apertures in each overlay requires that it must be formed of a strong, thick material in order to provide the required mechanical strength. As will be seen, this imposes a limitation on the number of overlays which can be disposd on the keyboard. To overcome this difficulty, U.S. Pat. No. 3,560,964 proposes the use of interchangeable overlay units integral with binders, in combination with a selection switch for identifying the individual binders. However, the approach requires a troublesome handling and increases the overall cost.

On the other hand, the digitalization of the coordinates of a probe or pen located on a tablet is known, and a keyboard apparatus has been manufactured which operates on this principle for inputting a quantity of information items. In a keyboard apparatus of this kind, the surface of the tablet is functionally subdivided into segments so that each segment functions as an independent key. An overlay is disposed on the tablet and is marked with a multiplicity of indicia at positions corresponding to the individual key segments. One of the advantages of such keyboard apparatus is the elimination of the need for providing a space between adjacent keys since the indicia can be indicated directly above the respective keys. In this manner, a tablet of a standard size may be provided with nearly 3,000 keys, and the overlay used may be a sheet of paper of an ordinary quality. Recently, a keyboard apparatus is proposed which permits a selective, interchangeable use of a plurality of overlay sheets with a single tablet, thus substantially increasing the number of information items which can be inputted in a simple manner. However, the sheet construction of the overlays suffers from the handling difficulty in that each time an overlay is changed, it must be fixedly positioned on the tablet.

SUMMARY OF THE INVENTION

It is a general object of the invention to provide a large capacity keyboard apparatus which is convenient in handling.

It is a specific object of the invention to provide a keyboard apparatus having a pair of tablets for use with a plurality of overlays bound in the form of a book and which may be formed of a paper of an ordinary quality.

It is another object of the invention to provide a keyboard apparatus having a pair of tablets which are associated with a common probe, which permits a signal of substantially constant level to be selectively derived from each of the tablets irrespective of the number of overlay sheets which are disposed on the individual tablets.

In accordance with the invention, there is provided a keyboard apparatus which comprises a pair of tablets internally carrying two sets of spaced driver lines disposed along a pair of coordinate axes and having its surface subdivided into a multiplicity of key segments each associated with an individual point of contact between the two sets of driver lines two pairs of scanning units, each pair being associated with one of the tablets, the scanning units being connected with the sets of driver lines and alternately activated to supply a drive signal to each set of driver lines in a sequential manner, one of the scanning units of one pair supplying one set of driver lines of the associated tablet with a drive signal which is time displaced with respect to any drive signal supplied by one of the scanning units of the other pair; an overlay unit including a plurality of overlays which are bound in the form of a book and disposed on the tablets so as to be able to assume an open position over each of the tablets, each overlay being formed with indicium segments at positions corresponding to the key segments; a selection switching device for producing a signal which identifies which one of the overlays assumes an open position over at least one of the tablets of the pair; a probe for sensing the drive signal from a desired key segment of a selected tablet through overlays disposed over that tablet; and a control unit for supplying a control signal to the scanning units and for receiving an output signal from the probe, the control unit producing a digital signal which identifies a desired indicium segment of a particular overlay from which the probe has sensed the drive signal and which is also responsive to an output signal from the selection switching device.

Generally, a keyboard apparatus of tablet type operates on a capacitive or magnetic coupling of a signal between the tablet and the probe, and the invention is applicable to either scheme. In either coupling scheme, the loss involved in the transmission of a signal between the tablet and the probe substantially depends on the number of overlays which are interposed therebetween. Specifically, if the pair of tablets are energized with drive signals of the same level and an equal number of overlays are disposed on the individual tablets, the signal level sensed by the probe from one tablet will be substantially equal to the signal level sensed from the other tablet. However, if one overlay is turned over onto either tablet, the number of overlays disposed over the individual tablets will differ by two sheets, preventing the probe from producing output signals of substantially equal level from the respective tablets. It will be appreciated that when overlays bound in the form of a book is disposed on the pair of tablets, the number of overlays on one tablet will vary inversely with the number of overlays on the other tablet, and hence the difference between the signal levels sensed by the common probe from the respective tablets is expected increase with the number of overlays. In determining a particular key of the tablet as the probe is applied against a corresponding indicium segment on a selected overlay, it is necessary to provide a detector which detects a signal level, sensed by the probe, being above a given threshold. The necessity of such detector will be appreciated from the need to eliminate a crosstalk in that the probe will sense a signal of a maximum amplitude from an immediately underlining driver line when the latter is energized with the pulse, but will also sense a noise signal from an adjacent driver line as it is energized. It then follows that a variation in the signal level exceeding a permissible range results in the inability of the detector to provide the detecting function.

In one preferred embodiment of the invention, there is provided means for electrically detecting the number of overlays which are disposed on at least one of the tablets and for controlling the level of the drive signal applied to one tablet relative to the other in response to a detection signal. In this manner, a compensation is achieved for a variation in the output level from the probe which occurs as a result of a varying loss involved in the signal transmission between each of the tablets and the probe, thus assuring a stabilized operation of the keyboard apparatus while allowing the use of a known detector. The detection of the number of overlays disposed actually over a tablet can be accomplished by using a mechanical switch or photoelectric switch which cooperates with an encoding provided on the overlays in the form of tags, apertures or notches, as illustrated in Japanese Patent Publication No. 24,306/1965 or Japanese Utility Model Publication No. 42,637/1972. Alternatively, an ordinary manual switch may be used.

BRIEF DESCRIPTION OF THE DRAWINGS

FIG. 3 is an equivalent circuit diagram illustrating the relationship between the tablet and the probe;

FIG. 4 is a circuit diagram of a specific example of the level compensation unit shown in FIG. 2; and FIG. 5 is a circuit diagram of a modification of the arrangement shown in FIG. 4.

DETAILED DESCRIPTION OF EMBODIMENT

In the description to follow, the invention is embodied as a keyboard apparatus having tablets which are capacitively coupled with a probe having a conductive tip. However, it will be appreciated by one skilled in the art that the invention is not limited thereto, but may be equally applied to other forms of tablets.

Figure 1:
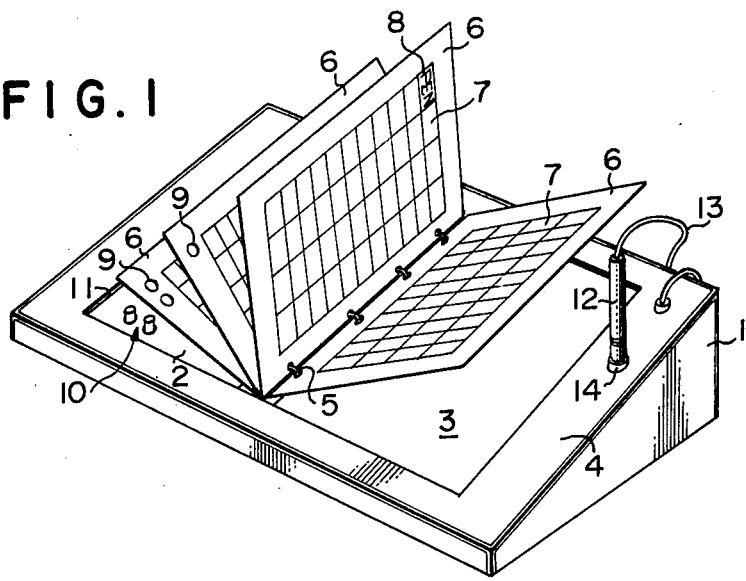
FIG. 1 is a perspective view of a keyboard apparatus according to the invention.

Referring to FIG. 1, there is shown the appearance of the keyboard apparatus according to the invention. The apparatus includes a body 1 in which are mounted a pair of tablets 2 and 3, which are adapted to be capacitively coupled with the probe. Specifically, the body 1 has a surface plate 4 having a pair of juxtaposed windows formed therein through which the surface of the tablets 2, 3 is exposed. While not shown, the surface of each tablet is subdivided into a multiplicity of key segments. A binder 5 is disposed between the tables 2, 3, and a plurality of overlays 6 are coupled with the binder 5 in the form of a book so as to permit any page thereof to be exposed. It is to be noted that for ease of illustration, the overlays 6 are shown in suspended positions, but they are disposed flatwise against the respective tablets in use. On its opposite surfaces, each overlay 6 is printed with indicium segments 7 which correspond to key segments on the tablets 2, 3. An indicium 8 may be entered into the segment 7. To establish a proper alignment between the indicium segments 7 and the key segments, each overlay 6 is dimensioned and constructed so that it can be correctly positioned against a window edge 11 of the surface plate 4 when it assumes an open position on either tablet 2 or 3.

Each overlay 6 is provided with an identification code 9 which is formed as a number of apertures, including the absence of aperture. One of the tablets, 2, is provided with a switching device 10 which functions to detect which one of the overlays 6 assumes an open position thereover. In the example given, four overlays 6 are shown, and in this instance the device 10 comprises a pair of switches located to cooperate with the code 9 so as to produce combinations of "on" and "off" in accordance with the code 9. This permits an electrical detection of the particular overlay which assumes an open position on the tablet 2, and also provides an identification of an overlay 6 which assumes an open position over the other tablet 3. It will be seen that the output from the switching device 10 corresponds to the number of overlays 6 which is disposed over a particular one of the tablets 2, 3. Assuming that each switch 10 is turned on when depressed, the condition that the both switches remain off indicate that a single overlay is disposed over the tablet 2 while three overlays are placed over the other tablet 3. Other suitable means for identifying a particular overlay 6 and for detecting the number of overlays over one tablet may be used, as disclosed in Japanese Patent Publication No. 24,306/1965 and Japanese Utility Model Publication No. 42,637/1972.

The keyboard apparatus also includes a common probe 12 for the pair of tablets 2, 3. The probe 12 is shown as connected with a lead wire 13 extending from the body 1. Normally, it may be plugged into a recess 14 formed in the surface plate 4, but may be removed therefrom for manual operation by an operator. In use, the operator applies the probe 12 against a desired indicium segment 7 of a selected overlay 6 which assumes an open position on one of the tablets 2, 3. In this manner, the probe 12 senses a signal from a corresponding key segment, and the signal is fed to a control unit to be described later for identification of the desired key segment. When the desired key segment is identified, a corresponding key signal is formed which is combined with an output signal from the switching device 10, producing a composite digital signal indicative of a particular indicia 8 entered into the particular indicium segment 7 which corresponds to the identified key segment.

Figure 2:
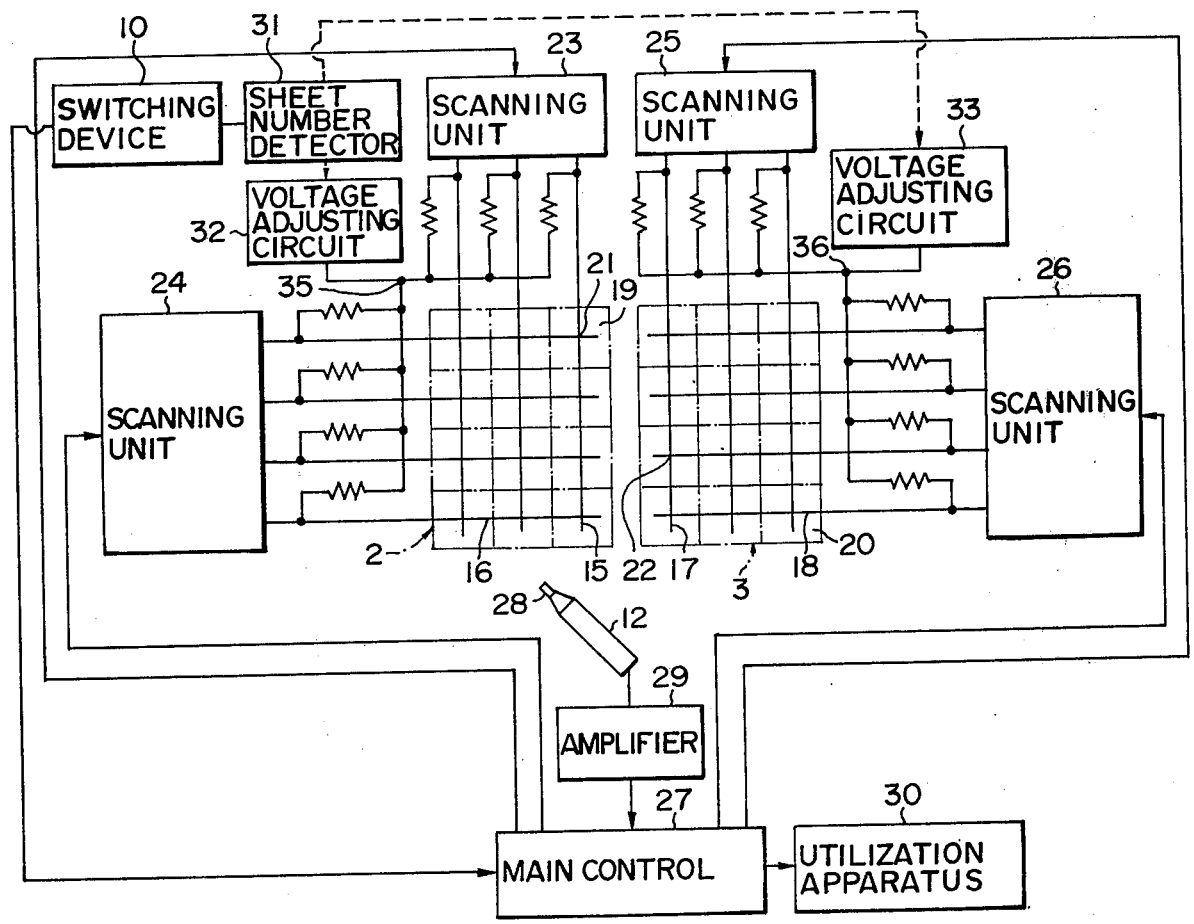
FIG. 2 is a circuit diagram of the keyboard apparatus shown in FIG. 1.

FIG. 2 shows a circuit arrangement of the keyboard apparatus. As shown, respective tablets 2, 3 are provided with two sets of driver lines or two groups of conductors 15, 16 and 17, 18 which are spaced apart parallel to a pair of coordinate axes. Each tablet has a surface in which a multiplicity of key segments 19, 20 are defined, each key segment being associated with a particular point of intersection, as shown at 21,22, between the sets of driver lines. In the drawing, these key segments are delineated by phantom lines. In the example shown, each key segment 19 or 20 contains one point of intersection 21 or 22 in its domain. However, each key segment may contain a plurality of points of intersection between a plurality of branch conductors, as is well known.

In the tablet 2, the sets of driver lines 15, 16 are connected with output terminals of a pair of scanning units 23, 24, respectively. Similarly, in the tablet 3, the sets of driver lines 17, 18 are connected with output terminals of a pair of scanning units 25, 26, respectively. Each of the scanning units 23 to 26 is supplied with a clock pulse from a main control unit 27 for supplying a drive pulse to its connected driver lines in a sequential manner. The scanning takes place in a manner such that the location signals radiated from the respective key segments 19, 20, or signals produced by the drive pulses passing through the sets of driver lines which extend through these key segments 19, 20 are distinguishable. In other words, the drive pulses applied to one set of driver lines passing through the key segments on one tablet may be of a same timing or a same phase as those applied of one set of driver lines on the other tablet if the drive pulses passing through the other set of driver lines on one tablet are time displaced from any drive pulse supplied to the other set of driver lines on the other tablet. Thus it is only necessary that the scanning units 23 to 26 supply differently timed or phased driver pulses to at least one set of driver lines of either tablet 2, 3. Illustratively, the arrangement can be simplified by driving the scanning units 24, 26 which energizes the sets of driver lines 16, 18 of the respective tablets 2, 3 with the same timing, and after completion of the scanning of these driver lines, driving the scanning unit 23 associated with the other set of driver lines 15 of the tablet 2, followed by driving the scanning unit 25 which sequentially energize the other set of driver lines 17 of the other tablet 3 subsequent to the completion of scanning of the driver lines 15. Such process may be repeated. In order to accomplish such scanning scheme, the main control 27 may produce a series of clock pulses which may be alternately supplied to the scanning units 23 to 26 while driving the scanning units 24 and 26 simultaneously.

While an overlay or overlays 6 are not shown in FIG. 2, the probe 12 is applied against a desired indicium segment 7 on a selected overlay 6. The probe 12 has a conductive tip 28 which, when applied against the overlay 6, renders an internally housed switch (not shown) conductive, achieving a capacitive coupling with the sets of driver lines underlining a key segment of either tablet 2 or 3 to thereby sense a flow of driver pulses therethrough. A signal sensed by the probe 12 is fed to an amplifier 29 and thence to the main control unit 27, which compares the timing or phase of such signal against the timing or phase of the clock pulses supplied to the scanning units 23, 24 or 25, 26 which energizes the tablet 2 or 3, thus identifying a particular combination of driver lines of the both sets which are capacitively coupled with the probe 12. In this manner, a digital signal is obtained which represents the key segment containing the point of intersection between these driver lines. The arrangement and the principle of operation of such main control is known as disclosed in Japanese Laid-Open Patent Application No. 41,625/1973 or U.S. Pat. No. 3,732,369, and therefore will not be specifically described. In accordance with the invention, an output signal from the switching device 10 which identifies a particular overlay 6 assuming an open position on either tablet 2 or 3 is also fed to the main control unit, and is combined with the identified key segment signal, thus producing a digital signal corresponding to the desired indicium 8, which digital signal is supplied to a utilization apparatus 30.

FIG. 3 shows an equivalent circuit diagram illustrating the relationship between the tablet 2 or 3 and the probe 12. A pulse source PG is coupled through a capacitance $C_1$ between the tablet and the probe with the input of the amplifier 29, which input is also shunted to the ground through a floating capacitance $C_2$. As will be seen, the capacitance $C_1$ decreases as the number of overlays 6 disposed between the tablet 2 or 3 and the probe 12 increases, reducing the magnitude of the pulse which is fed to the amplifier 29 through the capacitance $C_1$. The magnitude of the pulse produced by the pulse source PG depends on a control voltage of the scanning units 23 to 26 which comprise an integrated circuit of a known open collector form. With a constant control voltage as is practiced in the prior art, the output level from the probe 12 varies with the number of overlays between the tablet and the probe as mentioned above. However, the operation of the main control unit 27 is not influenced by a variation of the output level from the probe 12 within a certain permissible range. By experiments, it is found that when the overlays 6 has a thickness corresponding to a commonly used office paper, five overlays 6 bound in a book form can be used with the pair of tablets without substantial obstruction. In the worst case, the differential number of overlay 6 on the both tablets 2, 3 will be at the ratio of 4 to 1. Assuming that each tablet has 1,000 keys and that indicium segments 7 are distributed on a total of eight surfaces of the five overlays 6 (the first and fifth overlay serving only on its one surface), the resulting keyboard unit may be utilized to input 8,000 information items, which may be useful under certain circumstances. However, when the number of overlays 6 is increased beyond this figure, the variation in the signal level sensed by the probe 12 from the respective tablets 2, 3 will be substantial, causing an unstable operation, and eventually an operational inability, of the main control unit 27.

In accordance with the invention, there is provided a level compensation unit which adjust the control voltage to the scanning units 23 to 26 in accordance with the number of overlays 6 placed over the tablets 2, 3. The level compensation unit operates in a manner to assure an equal level of the signal sensed by the probe 12 from the respective tablets 2, 3 if the number of overlays interposed between the probe and the associated tablet varies. As a consequence, an increased number of overlays 6 can be used in the keyboard apparatus of the invention while assuring a stabilized operation thereof. The level compensation unit comprises a detector circuit 31 for detecting the number of overlays 6 placed on top of one tablet 2, and a pair of voltage adjusting circuits 32, 33 which responds to an output from the detector circuit 31 by adjusting the control voltage supplied to voltage terminals 35, 36 of scanning units 23, 24 and 25, 26, respectively, which drive the respective tablets 2, 3. Referring to FIG. 4, there is shown one specific form of the level compensation unit which is constructed on the assumption that four overlays are used. The detector circuit comprises a first and a second switch 40, 41, but the function of these switches may be served by the switching device 10 shown in FIG. 2. These switches are arranged so that the both remain off when a single overlay is placed on the tablet 2, one switch is on for two overlays and the both are turned on when three overlays are placed. The first and the fourth overlay are provided with indicium segments only on its inner surface, even though these overlays may be provided with such segments on its opposite surfaces. Hence it should be noted that the maximum number of overlays which may be disposed on each tablet is three. An arrangement for turning the switches 40, 41 on and off in accordance with the number of overlays placed on the tablet is known and will not be described. These switches 40, 41 are connected with three AND gates 42, 43, 44 which form shunt paths. Gate 42 is connected with the both switches 40, 41 through inverters 45, 46, and thus receive inverted outputs of these switches. Gate 43 has a first input which is connected with the switch 40 through the inverter 45 and a second input which receives a direct output from the switch 41. Gate 44 is connected to receive direct outputs from the switches 40, 41. When an overlay is placed on the tablet 2, gate 42 produces a high level output, and when two overlays are placed on the tablet 2, gate 43 produces a high level output. Finally, gate 44 produces a high level output when three overlays are placed on the tablet 2. The output of gates 42 to 44 is connected with a respective relay coil 47, 48, 49, the other end of which is connected with a voltage terminal 50.

The voltage adjusting circuits 32, 33 may be similar in circuit arrangement, and each include contacts 51, 52, 53 which are connected in three branch paths 54, 55, 56, respectively, and which are associated with the relay coils 47, 48, 49, respectively. Input resistors 57, 58, 59 are connected in series with the respective contacts in the branch paths, and have their end remote from the contacts connected with voltage terminals 60, 61, 62, respectively. The branch paths are connected in common and connected with a common input terminal of an amplifier 63, across which a feedback resistor 64 is connected. When voltage Vc of a same magnitude is applied to the voltage terminals 60 to 62, the amplifier 63 will produce an output voltage $V_0$ which is approximately proportional to the ratio $R_0/R_1$ when gate 42 conducts, to the ratio $R_0/R_2$ when gate 43 conducts, and to the ratio $R_0/R_3$ when gate 44 conducts, where $R_0$ represents the resistance of feedback resistor 64, and $R_1$ to $R_3$ that of input resistors 57 to 59, respectively.

In accordance with the invention, the resistance of input resistors 57 to 59 of one voltage adjusting circuit 32 is chosen such that $R_1 > R_2 > R_3$ while the resistance of input resistors 57 to 59 of the other voltage adjusting circuit 33 is chosen such that $R_1 < R_2 < R_3$. As the number of overlays placed on top of either tablet 2, 3 varies, the individual voltage adjusting circuits 32, 33 operate to adjust the magnitude of the control voltage applied to the voltage terminals 35, 36 of the scanning units 23 to 26, and hence the magnitude or level of the drive pulses supplied to the tablets 2, 3, in proportion to the number of overlays. As a consequence, the level of signals sensed by the probe 12 from either tablet can be maintained substantially constant if the number of overlays on the respective tablets 2, 3 changes. In the example shown, the two voltage adjusting circuits 32, 33 are associated with the single detector circuit 31, but separate detector circuits may be associated with the respective voltage adjusting circuits.

FIG. 5 shows a modification of the voltage adjusting circuits 32, 33. In this instance, the branch paths 54 to 56 only include the contacts 51 to 53, and are connected through a single input resistor 65 with the amplifier 63. Voltages $V_1$, $V_2$, $V_3$ of different magnitudes are applied to the voltage terminals 60 to 62 of the branch paths such that the inequality $V_1 < V_2 < V_3$ applies to one circuit 32 while the inequality $V_1 > V_2 > V_3$ applies to the other circuit 33. The operation is similar to the arrangement shown in FIG. 4. It should be understood that the combination of relay coils 47 to 49 and contacts 51 to 53 to turn the individual branch paths 54 to 56 on and off may be replaced by equivalent transistor circuits.

While the invention has been particularly illustrated and described with reference to a specific embodiment, it is to be understood that the principle of the invention is generally applicable to any keyboard apparatus comprising a tablet and a probe, one of which serves as a driver and the other of which serves as a sensor, with the probe sensing a signal from the tablet through an overlay. Thus, the capacitive coupling between the tablet and the probe may be replaced by magnetic coupling with equal effect.

Having described the invention, what is claimed is:

1. A keyboard apparatus comprising a pair of tablets each internally carrying two sets of driver lines spaced apart and disposed along coordinate axes and each having its surface subdivided into a multiplicity of key segments associated with each point of intersection between the sets of driver lines; two pairs of scanning units, each pair of scanning units being connected with the two sets of driver lines of one of the tablets, the scanning units being alternately activated to supply a drive signal to the sets of driver lines in a manner such that at least one of each pair of scanning units supplies one set of driver lines of the associated tablet with a drive signal which is time displaced from any drive signal supplied by one of the other pair of scanning units; an overlay unit including a plurality of overlays bound in the form of a book so that each overlay can assume an open position on either tablet, each overlay having indicium segments at positions corresponding to the key segments; a selection switching device for producing a signal which identifies which one of the overlays assumes an open position on at least one of the tablets; a probe for sensing the drive signal from a desired key segment on a selected one of the tablets through the overlays disposed on the tablet; and a control unit for supplying a control signal to each of the scanning units and for receiving an output signal from the probe, the control unit producing a digital signal indicative of a desired indicium segment of a particular overlay which assumes an open position on the selected tablet and against which the probe is applied, said particular overlay being specified by an output signal from the selection switching device.

2. A keyboard apparatus according to claim 1 in which one set of driver lines of one tablet is supplied with the drive signal from the corresponding scanning unit subsequent to the supply of the drive signal to one set of driver lines of the other tablet from the corresponding scanning unit and in which the other set of driver lines of said one tablet is supplied with the drive signal simultaneously with the other set of driver lines of the other tablet.

3. A keyboard apparatus according to claim 1 in which the probe is capacitively coupled with the tablet.

4. A keyboard apparatus comprising a pair of tablets each internally carrying two sets of driver lines which are spaced apart and disposed along coordinate axes and having its surface subdivided into a multiplicity of key segments each associated with a point of intersection between the set of driver lines; two pairs of scanning units, each pair of scanning units being connected with the two sets of driver lines of one of the tablets, the scanning units being alternately activated for supplying a drive signal to the sets of driver lines in a sequential manner such that at least one of each pair of scanning units supplies one set of driver lines of the associated tablet with a drive signal which is time displaced from any drive signal supplied by one of the other pair of scanning units; an overlay unit including a plurality of overlays bound in the form of a book so as to permit each overlay to assume an open position over either one of the tablets, each overlay having indicium segments at positions corresponding to the key segments; a selection switching device for producing a signal which identifies which one of the overlays assumes an open position on at least one of the tablets; a probe for sensing the drive signal from a desired key segment on a selected one of the tablets through the overlays disposed thereon; a control unit for supplying a control signal to each of the scanning units and for receiving an output signal from the probe, the control unit producing a digital signal indicative of a desired indicium segment of a particular overlay which assumes an open position on the selected tablet and against which the probe is applied, the particular overlay being specified by an output signal from the selection switching device; a detection circuit for detecting the number of overlays on at least one of the tablets; and a control voltage adjusting circuit responsive to an output from the detection circuit for adjusting the magnitude of the control voltage supplied to each pair of scanning units associated with each tablet.

5. A keyboard apparatus according to claim 4 in which the detection circuit operates in conjunction with the operation of the selection switching device.

6. A keyboard apparatus according to claim 4 in which the control voltage adjusting circuit comprises a pair of circuit arrangements, which adjust the magnitude of the control voltage supplied to the respective pairs of the scanning units in inverse relationship to each other.

7. A keyboard apparatus according to claim 6 in which each of the circuit arrangements comprises a plurality of resistive paths having different resistance values and connected to shunt with a common voltage source, and a plurality of switches which select one of the resistive paths.

8. A keyboard apparatus according to claim 6 in which each of the circuit arrangements comprises a plurality of parallel paths connected with voltage sources of mutually different magnitudes, and a plurality of switches for selecting one of the parallel paths.

9. A keyboard apparatus comprising a tablet internally carrying two sets of driver lines spaced apart and disposed along coordinate axes and each having its surface subdivided into a multiplicity of key segments each associated wtih a point of intersection between the set of driver lines; a pair of scanning units connected with the two sets of driver lines of the tablet, the scanning units being alternately activated for supplying a drive signal to the sets of driver lines in a sequential manner; a plurality of overlays each having indicium segments at positions corresponding to the key segments; a selection switching device for producing a signal which identifies which one of the overlays assumes an open position on the tablet; a probe for sensing the drive signal from a desired key segment on the tablet through the selected number of overlays disposed thereon; a control unit for supplying a control signal to the scanning units and for receiving an output signal from the probe, the control unit having means for producing a digital signal indicative of a desired indicium segment of a particular overlay which assumes an open position on the tablet and against which the probe is applied, the particular overlay being specified by an output signal from the selection switching device; a detection circuit for detecting the number of overlays on the tablet; and a voltage adjusting circuit responsive to an output from the detection circuit for adjusting the magnitude of the voltage of the drive signal supplied to the sets of driver lines.

10. A keyboard apparatus according to claim 9 in which the control voltage adjusting circuit comprises means defining a plurality of resistive paths having different resistance values and connected in shunt with a common voltage source, and a plurality of switches to select one of the resistive paths.

11. A keyboard apparatus according to claim 9 in which the control voltage adjusting circuit comprises means defining a plurality of parallel electrical paths connected with voltage sources of mutually different magnitudes, and a plurality of switches for selecting one of the parallel paths.

* * * * *